March 27, 1934.  H. T. FAUS  1,952,160
MEASURING INSTRUMENT
Filed March 11, 1933

Inventor:
Harold T. Faus,
by Charles E. Tullar
His Attorney.

Patented Mar. 27, 1934

1,952,160

UNITED STATES PATENT OFFICE 1,952,160

MEASURING INSTRUMENT

Harold T. Faus, Lynn, Mass., assignor to General Electric Company, a corporation of New York Application March 11, 1933, Serial No. 660,425

7 Claims. (Cl. 171—95)

My invention relates to electrical instruments and concerns particularly measuring instruments of the type employing permanent magnets.

The primary object of my invention is to provide a simple construction for measuring instruments whereby sturdy reliable instruments may readily be produced at low cost.

It is a further object of my invention to provide an arrangement whereby a uniform flux density or uniform variation in flux density may be obtained in the airgap of an instrument employing a permanent magnet without using separate soft iron pole pieces.

It is still another object to provide an arrangement whereby the degree of variation in flux density may be modified after the instrument is constructed in order to conform to a predetermined scale distribution. Other and further objects and advantages will become apparent as the description proceeds.

In accordance with my invention in its preferred form I make use of a substantially C-shaped permanent magnet comprising a plurality of laminations of permanent magnet material stacked together, the portions of the laminations forming the pole pieces being integral with the yoke portions. Owing to the high coercive force of material suitable for permanent magnets, it is difficult to obtain a uniform variation in flux density in the airgap when the pole pieces are formed integral with the magnet, since the various portions of the poles may not be uniformly magnetized and the manner in which the keeper is removed after the material is magnetized causes variations in the pole strength in different portions of the pole pieces. Consequently, the flux distribution in the air gap for instruments employing magnets having integral pole pieces is not only unsatisfactory, but since the distribution tends to vary widely with different instruments, it is practically impossible to produce several instruments having uniform calibrations. In accordance with my invention, this difficulty is overcome by inserting one or more leaves of material having a high permeability in comparison with the permanent magnet material, between the pole portions of the permanently magnetized laminations. The leaves are also preferably made adjustable in position in order to permit varying the distribution of flux density in different portions of the air gap.

Figure 1:
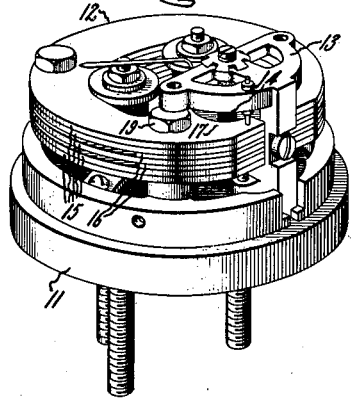
Figure 2:
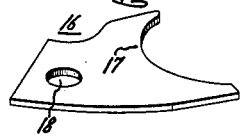
Figure 3:
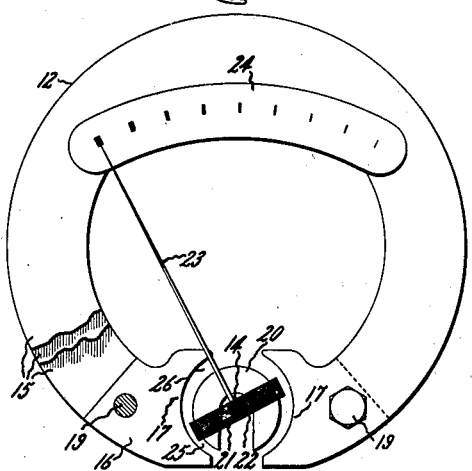

The features of my invention which I believe to be novel and patentable will be pointed out in the claims appended hereto. A better understanding of my invention itself however may be obtained by referring to the following description taken in connection with the accompanying drawing in which Fig. 1 represents in perspective an instrument with its cover removed forming one embodiment of my invention; Fig. 2 represents in perspective one of the relatively permeable leaves or inserts used to obtain uniform flux distribution; and Fig. 3 is a schematic diagram explaining the construction and showing the magnetic circuit of the embodiment illustrated in Fig. 1.

Referring now more in detail to the drawing in which like reference characters refer to like parts throughout, the instrument illustrated in Fig. 1 comprises a base 11 supporting a magnetic core 12 and a non-magnetic member 13 providing a support for a movable element 14. The core 12 comprises a plurality of laminations 15 of permanently magnetized material stacked to form a permanent magnet with integral poles, and one or more pairs of leaves or inserts 16 of material having a high permeability and a low coercive force relative to the material of lamination 15 having pole portions 17 conforming substantially in shape to the pole portions 17 of the permanently magnetized laminations 15 inserted in the end portions of the core 12 between one or more pairs of laminations 15. The employment of a laminated core 12 permits the use of material punched from sheet steel, thereby avoiding the expense of magnet steel castings. The inserts 16 may be composed of annealed soft iron, low carbon steel or any other material more permeable than magnet steel. I have found, for example, that an alloy of 46 to 48 per centum of nickel and the remainder iron, may satisfactorily be employed. Openings 18 are provided in the inserts 16 which cooperate with corresponding openings in the laminations 15 to permit insertion of a bolt 19 serving to fasten the laminations 15 and inserts 16 together. Owing to the fact that the inserts 16 are fixed at only a single point with respect to the laminations 15 before the bolt 19 is tightened down it is possible to rotate the inserts 16 in one direction or another around the bolt 19 in order to vary the spacing and shape of the air gap between different portions of the opposite pole portions or polar projections 17. Preferably, a core 20, the greater portion of which is substantially circular in cross-section and which may, if desired, also be adjustable in position and also comprise a plurality of laminations stacked one above another, is placed between the polar projections 17 in order to reduce the reluctance of the magnetic circuit.

It leaves a substantially annular air gap between the core 20 and the polar projections 17. The central yoke portion of the permanent magnet may have its laminations 15 clamped together.

The movable member 14 may be of any desired type customarily used in connection with permanent magnet instruments. By way of illustration, I have shown a construction suitable for a ratio instrument comprising two current-conducting coils 21 and 22 eccentrically mounted on opposite sides of the center of the movable member 14, but it will be understood that my invention is not limited to ratio instruments and includes any type of instrument employing a permanent magnet with air gaps for current-conducting coils. In the arrangement shown, the movable member 14 carries a pointer 23 cooperating with a scale 24 to form an indicating instrument, but it will be understood that my invention is not limited thereto but obviously includes recording instruments, contact-making instruments, and the like.

Preferably, the inserts 16 are made relatively short in length so as to shunt only a relatively short portion of the magnetic circuit formed by the permanently magnetized laminations 15 since the shunted portion is relatively ineffective for producing magnetizing force. The relatively high permeability of the inserts 16, however, causes the flux distribution in the air gap of the instrument to vary substantially as the relative lengths of the air gap in different portions thereof and to be relatively little affected by inherent differences in the pole strength of the permanent magnet 12 in different portions of the poles 17. The inserts 16 may be rotated so that the equivalent length of the air gap is substantially the same throughout for instruments in which a constant flux density is desired throughout the air gap, or may be so arranged that the equivalent length of the portion 25 of the air gap is less than that in the portion 26 of the air gap in order to produce a field in which the flux density continuously decreases from the portion 25 to the portion 26, as required in connection with ratio instruments. The relative flux densities in different portions of the air gap may be modified by rotating the leaves 16 in the required direction in order to modify the scale distribution of the instrument. For example, if the inserts 16 on the left-hand side are rotated in a counterclockwise direction so as to decrease the length of the portion 25 of the air gap and increase the length of the portion 26, the left-hand portion of the scale may be congested a given amount and the right-hand portion may be congested a lesser amount, the middle portion being unaffected. In a similar manner, clockwise rotation of the inserts on the right-hand side will produce a given congestion of the right-hand portion of the scale and a lesser congestion of the left-hand portion. These adjustments combined with an adjustment obtained by movement of the core 20 provide means of meeting a predetermined scale distribution in cases where the ratios depart somewhat from the values on which the original scale distribution was determined.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A ratio instrument comprising a laminated permanent magnet having polar projections with an air gap therebetween, a movable element carrying a pair of opposing current conducting coils arranged to rotate in said gap, said permanent magnet having auxiliary laminations of magnetic material having higher permeability than said permanent magnet inserted in the polar projections of said permanent magnet for the purpose of distributing the flux along the air gap.

2. An electrical instrument comprising a plurality of laminations of permanently magnetized steel forming a magnetized yoke having a pair of polar projections with a substantially circular air gap therebetween, a movable element having a current-conducting coil adapted to rotate in said air gap, and relatively short laminations of relatively permeable magnetic material inserted in the polar projections of said magnet between said permanently magnetized laminations for the purpose of distributing the magnetic flux along said air gap.

3. An electrical instrument comprising a plurality of laminations of permanent magnet steel stacked one upon another to form a magnetic core having a pair of polar projections with an air gap therebetween, a movable element arranged to deflect in said air gap, and relatively short laminations of magnetic material having higher permeability than said permanent magnet steel inserted between said laminations of permanently magnetized material at the ends forming said magnetic polar projections, said inserted laminations being adjustably supported to permit varying the relative length of different portions of the air gap thereby modifying the degree of variation of the flux density in said air gap to permit obtaining a predetermined scale distribution of said instrument and avoiding the necessity for individual calibration of instruments.

4. A magnetic member for an electrical instrument comprising a plurality of laminations composed of permanently magnetized material stacked to form a permanent magnet, the ends of said laminations extending toward one another to form magnetic polar projections having an air gap therebetween, a core composed of more permeable material than said permanent magnet located in the space between said polar projections to form a substantially annular air gap, and leaves of magnetic material more permeable than said permanently magnetized material inserted between said laminations of permanently magnetized material at the portions forming said magnetic polar projections for the purpose of distributing the magnetic flux along said air gap.

5. A magnetic core for an electrical instrument comprising a plurality of yoke-shaped laminations of permanently magnetized material stacked to form a permanent magnet having a pair of polar projections with a space therebetween, a member of substantially circular section composed of material more permeable than said permanent magnet located between said polar projections to form a substantially annular air gap, and leaves of magnetic material more permeable than said permanently magnetized material conforming in shape to the portions of said laminations forming the polar projections of said magnet and inserted between said portions of the laminations, said leaves being adjustable in position for the purpose of obtaining a predetermined variation in flux density from one portion of said air gap to another.

6. A magnetic member for an electrical instrument comprising a plurality of laminations composed of permanently magnetized material stacked to form a permanent magnet having integral polar projections at its ends, and relatively short laminations composed of magnetic material more permeable than said permanently magnetized material inserted between the pole portions of adjacent permanently magnetized laminations for the purpose of distributing the magnetic flux along the faces of said polar projections.

7. A magnetic member for an electrical instrument comprising a plurality of laminations composed of permanently magnetized material stacked to form a permanent magnet having integral polar projections at its ends, and relatively short laminations inserted between the pole portions of adjacent permanently magnetized laminations for the purpose of distributing the magnetic flux along the faces of said polar projections, said inserted laminations being composed of an alloy comprising 46 to 48% nickel and the remainder iron.

HAROLD T. FAUS.